Figure 1:
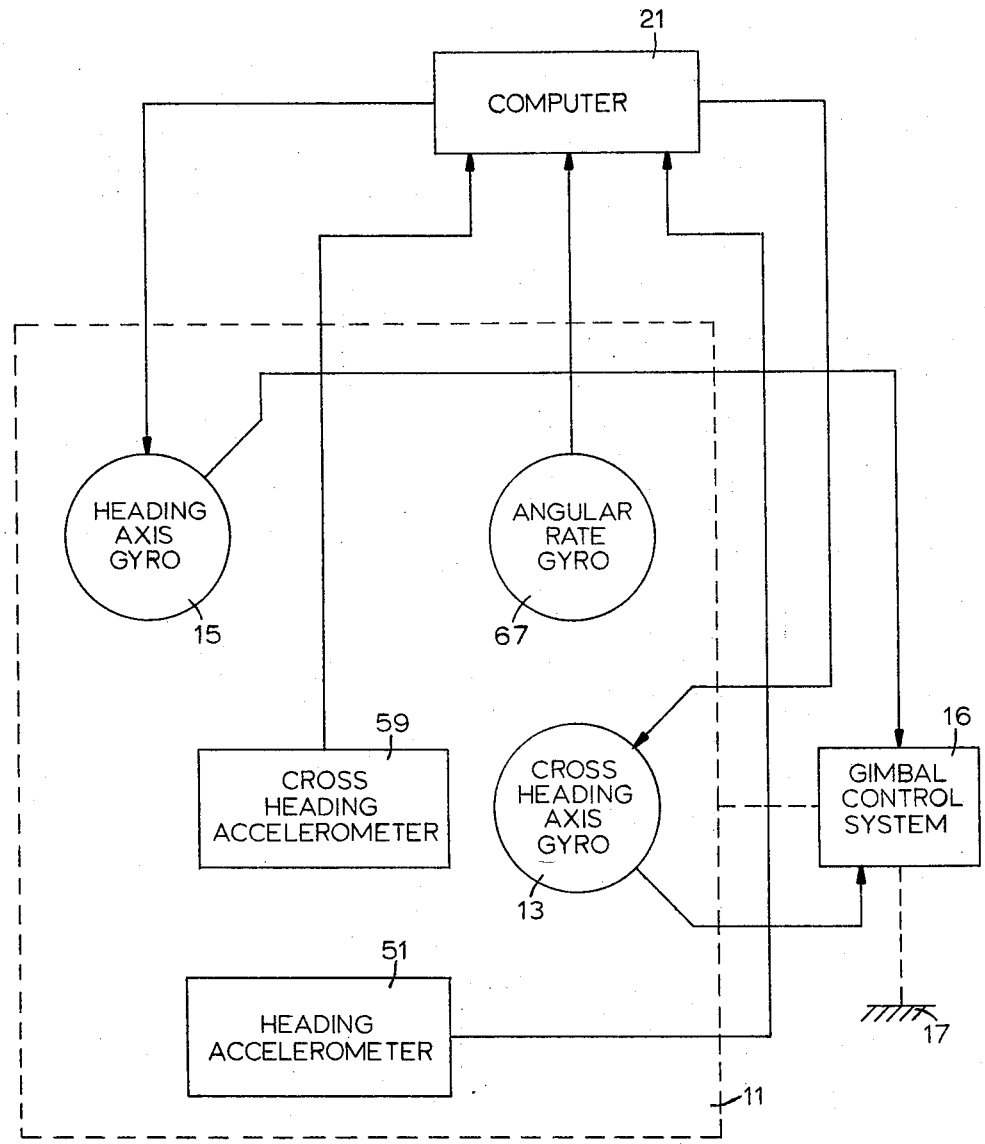

Oct. 25, 1966     H. LERMAN ETAL     3,281,581
GYROCOMPASSING SYSTEM
Filed June 27, 1962     2 Sheets-Sheet 1

HAROLD LERMAN
LOUIS FERRARI
INVENTORS

BY S. A. Giarratana
George B. Oujevolk
ATTORNEYS

United States Patent Office 3,281,581
Patented Oct. 25, 1966

3,281,581
GYROCOMPASSING SYSTEM
Harold Lerman, Paramus, and Louis Ferrari, Allendale, N.J., assignors to General Precision Inc., Little Falls, N.J., a corporation of Delaware
Filed June 27, 1962, Ser. No. 205,705
6 Claims. (Cl. 235—150.25)

This invention relates to inertial navigation, and more particularly to a gyrocompassing system for computing the initial heading angle in a hybrid strapdown inertial navigation system.

In a copending application entitled Hybrid Strapdown Inertial Navigation System, Serial No. 194,765, invented by Harold Lerman and filed on May 15, 1962, there is disclosed an inertial navigation system which makes use of a platform which is stable about two axes, referred to as the heading and cross heading axes, but not about the third axis, which is the vertical or Z axis. In such a system the cluster of the platform does not pivot about the heading or cross heading axes with respect to the gyro or gyros defining an inertial reference as the vehicle carrying the system maneuvers, but does pivot about the Z axis with the vehicle as the vehicle maneuvers so that the heading axis remains aligned with the horizontal component of the longitudinal axis of the aircraft. In other words, the heading axis and the longitudinal axis of the vehicle are maintained in a vertical plane. This means that the rate of turning of the cluster about the Z axis with respect to inertial space will equal the rate of turning of the vehicle about the Z axis with respect to inertial space.

As pointed out in the aforementioned application, the computers used to derive navigational information from the inertial signals produced by the platform require that a signal representing the initial heading angle be provided. The heading angle, designated $\psi$, is the angle between the heading axis and north and the initial heading angle, designated $\psi o$, is the heading angle at the start of the operation of the system. The initial heading angle is computed when the system is aligned prior to when the aircraft starts to maneuver. The present invention provides an improved system for generating the signal representing the initial heading angle. According to the invention, the initial heading angle is computed by gyrocompassing. This gyrocompassing operation is carried out while the vehicle is stationary but after the Z axis has been initially aligned with vertical. Amplifiers are connected to amplify the output signals of accelerometers mounted on the cluster to measure the acceleration of the platform along the heading and cross heading axes. The output signals from the amplifiers are used to torque the heading and cross heading gyros with polarities to maintain the platform level. The output signals from the amplifiers are also fed to a resolver servo system, which produces an output signal representing the initial heading angle. This signal, which is the output signal of the gyrocompassing system, is used to provide corrections to the torquing of the heading and cross heading gyros for the earth's rate of rotation. When the output signal of the resolver servo system does not correctly represent the initial heading angle, the gyros will not maintain the Z axis aligned with vertical, but will cause it to assume an angle with respect to vertical depending upon the difference between the angle represented by the output signal of the resolver servo and the initial heading angle. The accelerometers sense components of gravity depending upon the misalignment of the Z axis from vertical and therefore depending upon the difference between the angle represented by the output signal of the resolver servo and the initial heading angle. Thus the output signals of the amplifiers will depend upon this difference. In response to these output signals of the amplifiers, the resolver servo system will produce an output signal correctly representing the initial heading angle. The gyros will then precess in response to the output signals of the amplifiers and align the Z axis of the cluster with vertical. When equilibrium is reached, the output signal of the resolver servo will correctly represent the initial heading angle, the Z axis will be aligned with vertical, and the output signals of the amplifiers will be zero.

Accordingly, a principal object of this invention is to provide an improved system for generating a signal representing the initial heading angle for a hybrid strapdown inertial navigation system.

A further object of this invention is to provide a system for generating a signal representing the initial heading angle by gyrocompassing for a hybrid strapdown inertial navigation system.

Figure 2:
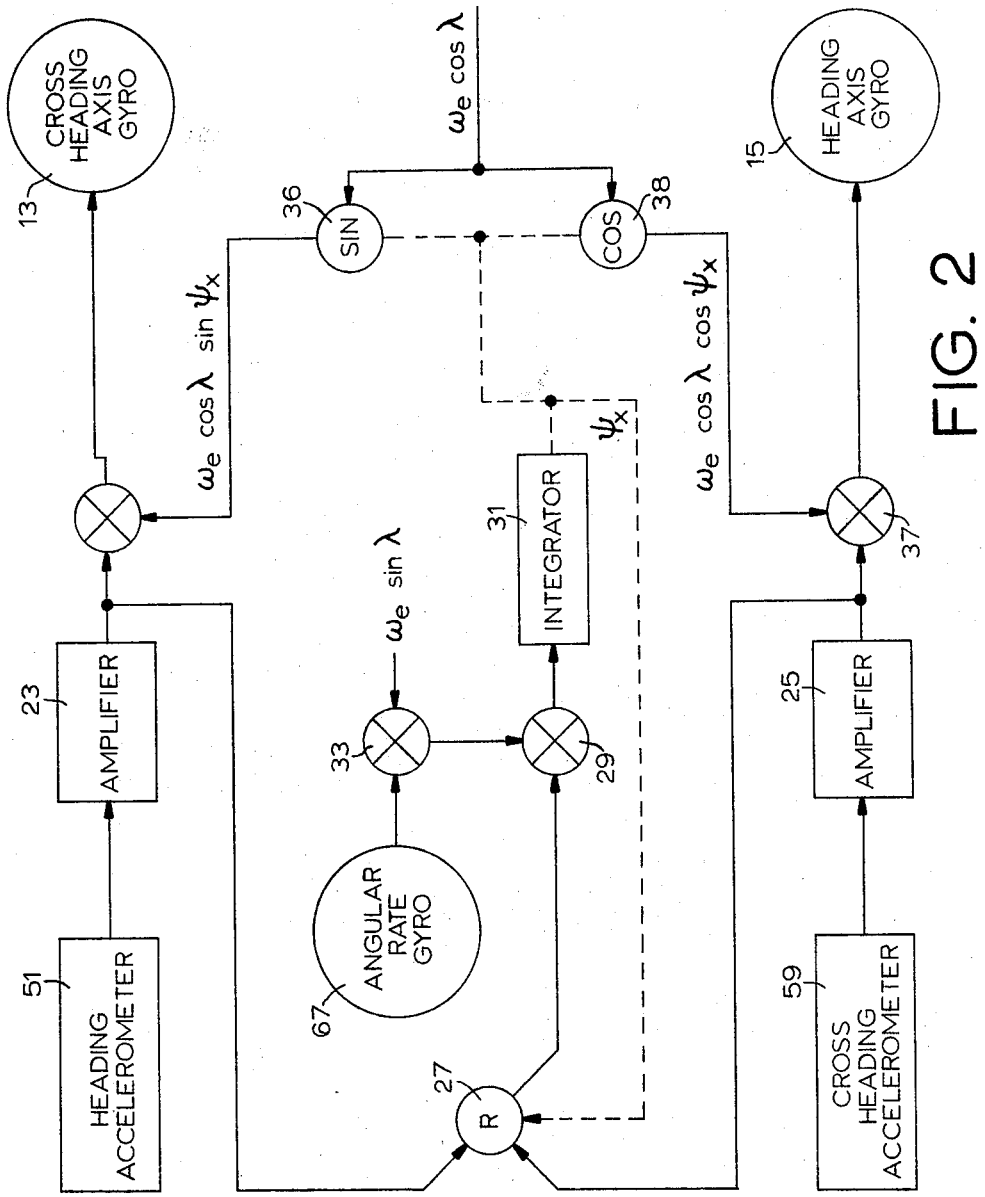

Further objects and advantages of the present invention will become readily apparent as the following detailed description of the invention unfolds and when taken in conjunction with the drawings, wherein:

FIG. 1 illustrates schematically the hybrid inertial navigation system to which the present invention applies; and FIG. 2 is a block diagram of the system of the invention for generating a signal representing the initial heading angle for use in the hybrid inertial navigation system of FIG. 1.

In the system schematically illustrated in FIG. 1, the cluster is designated by the reference number 11. Three mutually perpendicular axes are defined in the cluster 11. One of these axes, designated as the Z axis, is adapted to be aligned with vertical. The other two axes, which are oriented in a horizontal plane, are designated as the heading and cross heading axes. The cluster 11 is mounted on the frame 17 of the vehicle by means of a gimbal control system 16. A heading axis gyro 15 and a cross heading axis gyro 13 are mounted on the cluster 11 to maintain the alignment of the Z axis. When the cluster 11 starts to pivot about the heading axis with respect to the gyro 15 as a result, for example, of maneuvers of the vehicle, the gyro 15 generates a signal which is fed to the gimbal control system 16. The gimbal control system 16, in response to this signal, will pivot the cluster 11 about the heading axis with respect to the vehicle frame 17 in a direction to eliminate the output signal of the heading axis gyro 15. In this manner, the cluster 11 is maintained unpivoted about the heading axis with respect to the heading axis gyro and the inertial reference defined thereby as the vehicle maneuvers. When the cluster 11 starts to pivot about the cross heading axis with respect to the cross heading axis gyro 13 as a result, for example, of maneuvering of the vehicle, the gyro 13 will feed a signal to the gyro control system 16, which in response thereto will pivot the cluster 11 about the cross heading axis with respect to the vehicle frame 17 in a direction to eliminate the output signal from the cross heading gyro 13 so that the cluster 11 is maintained unpivoted about the cross heading axis with respect to the gyro 13 and the inertial reference defined thereby. In this manner the Z axis is maintained aligned with the gyros 13 and 15. The gimbal control system 16 locks the cluster 11 about the Z axis with respect to the vehicle frame so that the heading and cross heading axes will not pivot about the Z axis with respect to the vehicle, but will turn with the vehicle frame when the vehicle frame pivots about the Z axis as the vehicle maneuvers. In this manner the cluster 11 is stabilized about the cross heading axis and the heading axis, but is unstabilized about the Z axis. A cross heading accelerometer 59 is mounted on the cluster 11 to measure the acceleration of the cluster 11 along the cross heading axis. The cross heading accelerometer 59 produces a signal representing this acceleration and feeds this signal to a computer 21. A heading accelerometer 51 is mounted on the cluster 11 to measure the acceleration of the cluster 11 along the heading axis and produce an output signal representing this acceleration. The output signal of the heading accelerometer 51 is also fed to the computer 21. An angular rate gyro 67 is mounted on the cluster 11 to measure the rate at which the cluster 11 pivots about the Z axis and produces an output signal representing this rate. The output signal of the angular rate gyro 67 is also fed to the computer 21. The computer 21, in response to the signals received from the cross heading accelerometer 59, the heading accelerometer 51 and the angular rate gyro 67, performs mathematical operations on these signals to provide the desired navigational data. The Z axis is maintained aligned with vertical by Schuler tuning as the vehicle maneuvers. Accordingly the computer 21 feeds signals back to the heading axis gyro and the cross heading axis gyro to cause these gyros to pivot about the heading and cross heading axes at rates to maintain the Z axis aligned with vertical in accordance with the principles of Schuler tuning. This hybrid strapdown inertial navigation system is fully described in the copending application Serial No. 194,765, entitled Hybrid Strapdown Inertial Navigation System, invented by Harold Lerman and filed on May 15, 1962. As pointed out in this copending application, the computer 21 requires the initial heading angle to be fed thereto as an input signal. The initial heading angle, as pointed out above, is the angle between the heading axis and north at the start of the operation of the system. A signal representing this initial heading angle is produced during the alignment of the inertial navigation system prior to the start of the maneuvering of the vehicle.

In accordance with the present invention, the signal representing the initial heading angle is generated by a gyrocompassing technique. The system for generating this signal is illustrated in block form in FIG. 2. As shown in FIG. 2, the output of the heading accelerometer 51 is amplified by an amplifier 23 and the output signal of the cross heading accelerometer 59 is amplified by an amplifier 25. The output signals of the amplifiers 23 and 25 are fed to a resolver 27, which is provided with an input shaft and which produces an output signal proportional to the sum of the output signal of the amplifier 25 times the sine of the input shaft angle of the resolver 27 minus the output signal of the amplifier 23 times the cosine of the input shaft angle. Thus the output signal of the resolver 27 will be proportional to $A \sin \psi x - B \cos \psi x$ in which $\psi x$ is the angular position of the input shaft of the resolver 27, $A$ is the output signal of the amplifier 25, and $B$ is the output signal of the amplifier 23. It will be noted that when $A \sin \psi x$ equals $B \cos \psi x$, the output signal of the resolver 27 will be 0. The output signal of the resolver 27 is fed through an adding means 29 to an integrator 31, which produces its output signal mechanically as the angular position of an output shaft. The output shaft of the integrator 31 drives the input shaft of the resolver 27. Thus the output signal represented mechanically by the angular position of the output shaft of the integrator 31 is $\psi x$. The integrator 31 will continue to drive the input shaft of the resolver 27 in response to the output signal of the resolver 27 until the output signal of the resolver 27 becomes 0. Since the vehicle is stationary, the amplifiers 23 and 25 will only produce output signals if the Z axis of the cluster is not aligned with vertical. The output signals of the amplifiers 23 and 25 are fed to the cross heading axis gyro 13 and the heading axis gyro 15, respectively, to torque the gyros 13 and 15 in directions to eliminate the output signals of the amplifiers 23 and 25. The mechanical output signal of the integrator 31, which signal also represents $\psi x$, is fed to a sine function computer 36, which also receives a signal representing $\omega e \cos \Lambda$. In response to the applied signals, the sine function computer 36 produces an output signal representing $\omega e \cos \Lambda \sin \psi x$. The mechanical output signal of the integrator 31 representing $\psi x$ is also fed to a cosine function computer 38, which also receives a signal representing $\omega e \cos \Lambda$. In response to the applied signals the cosine computer 38 generates an output signal representing $\omega e \cos \Lambda \cos \psi x$. The output signal of the sine computer 36 is combined with the output signal of the amplifier 23 in the adding means 35 and applied to the cross heading gyro 13. The polarity of the output signal of the sine function computer 36 is selected so that it will be added to the output signal of the amplifier 23 in the adding means 35. The output signal of the cosine function computer 38 is combined with the output signal of the amplifier 25 in the adding means 37 and applied to the heading axis gyro 15. The polarity of the output signal of the cosine function computer 38 is selected so that the output signal thereof is substracted from the output signal of the amplifier 25 in the adding means 37. If $\psi x$ were equal to $\psi o$, the initial heading angle which is being computed, the signals applied from the sine and cosine function computers 36 and 38 through the adding means 35 and 37 to the gyros 13 and 15 would continuously correct the alignment of these gyros for the earth's rate of rotation. When $\psi x$ does not equal $\psi o$, the heading and cross heading axis gyros 13 and 15 will precess out of alignment so that the Z axis of the platform pivots out of alignment with vertical. The earth's rate of rotation causes the cross heading axis to precess at a rate equal to $\omega e \cos \Lambda \sin \psi o$. The output signals of the amplifier 23 and the sine function computer 36 cause the gyro 13 to pivot about the cross heading axis at a rate proportional to $B + \omega e \cos \Lambda \sin \psi x$ in the opposite direction to the precession caused by the earth's rate of rotation. Thus the total rate of precession of the gyro 13 about the cross heading axis will equal $$B + \omega e \cos \Lambda \sin \psi x - \omega e \cos \Lambda \sin \psi o$$

The gyro 13 will continue to precess about the cross heading axis causing the output signal of the amplifier 23 to change until $B + \omega e \cos \Lambda \sin \psi x - \omega e \cos \Lambda \sin \psi o = 0$. At this time, the output signal of the amplifier 23 will represent $\omega e \cos \Lambda \sin \psi o - \omega e \cos \Lambda \sin \psi x$. The earth's rate of rotation causes the gyro 15 to precess about the heading axis at a rate equal to $\omega e \cos \Lambda \cos \psi o$. The output signal of the cosine function computer 38 when applied to the heading axis gyro 15 causes it to precess about the heading axis at a rate equal to $\omega e \cos \Lambda \cos \psi x$ in the opposite direction to the precession caused by the earth's rate of rotation. When the precession of the heading axis gyro about the heading axis has caused the Z axis to move out of alignment with vertical, the output signal $A$ of the amplifier 25 will no longer be zero and will also cause precession of the heading axis gyro 15. Thus the total precession of the heading axis gyro will equal $$A - \omega e \cos \Lambda \cos \psi x + \omega e \cos \Lambda \cos \psi o$$

The heading axis gyro 15 will continue to precess about the heading axis until the output signal of the amplifier 25 becomes such that the quantity $$A - \omega e \cos \Lambda \sin \psi x + \omega e \cos \Lambda \cos \psi o$$

becomes 0. At this point the output signal of the amplifier 25 will equal $\omega e \cos \Lambda \cos \psi x - \omega e \cos \Lambda \cos \psi o$. Thus the Z axis becomes misaligned with vertical by an amount depending upon the difference between $\psi o$ and $\psi x$.

In response to the output signals of the amplifiers 23 and 25, the resolver 27 produces an output signal representing the quantity $(\omega e \cos \Lambda \cos \psi o - \omega e \cos \Lambda \cos \psi x) \sin \psi x - (\omega e \cos \Lambda \sin \psi x - \omega e \cos \Lambda \sin \psi o) \cos \psi x$. Thus when the mechanical output signal of the integrator 31 drives the input of the resolver 37 until the output signal of the resolver 27 becomes 0, $\psi x$ will equal $\psi o$ and the output signal of the integrator 31 will represent $\psi o$. Thus the output signal of the sine function computer 36 will represent $ω_e \cos Λ \sin ψ_o$ so that the gyro 13 will be automatically precessed back to the point where the output signal of the amplifier 23 is 0. Similarly, the output signal of the cosine function computer 38 will represent $ω_e \cos Λ \cos ψ_o$ and the gyro 15 will be automatically precessed back to the point where the output signal of the amplifier 25 is again 0. At this point the Z axis of the cluster will be aligned again with vertical.

In a practical system the vehicle on which the gyrocompassing is being carried out will not actually be stationary, but due to vibration and other causes will have some motion. As a result the cluster 11 will have some angular rotation about the Z axis. The output signal of the angular rate gyro 67 is fed to an adding means 33 where it is combined with a signal representing $ω_e \sin Λ$. This signal representing $ω_e \sin Λ$ corrects the output signal of the angular rate gyro 67 for the earth's rate of rotation. The output signal of the adding means 33 is combined with the output signal of the resolver 27 in the adding means 29 to provide a continuous correction signal to correct the initial heading angle $ψ_o$ for rotation of the cluster 11 about the Z axis during the gyrocompassing process.

The system could operate without the signal from the angular rate gyro 67. If the signal from the angular rate gyro 67 were not used and an angular rotation were to occur about the Z axis, the precession of the heading axis gyro 13 and cross heading axis gyro 15 due to the earth's rate of rotation would change. As a result the Z axis of the platform would position itself in a new orientation in order for the output signal B of amplifier 23 to equal $ω_e \cos Λ \sin ψ_x - ω_e \cos Λ \sin ψ_o$ and for the output signal A of the amplifier 25 to equal $$ω_e \cos Λ \cos ψ_o - ω_e \cos Λ \cos ψ_x$$

In response to these signals the resolver 27 and the integrator 31 would produce a new output signal representing the new heading angle $ψ_o$. However, the sluggishness of this operation would cause excessive errors in the system when the angular motion is due to vibration. The purpose of the signal from the angular rate gyro 67 in the gyrocompassing system is to correct the output signal of the integrator 31 for rotation of the vehicle due to vibration before the gyrocompassing loop can respond to them. In this manner the errors which would be caused by the sluggishness of the gyrocompassing loop are prevented.

The signals representing $ω_e \sin Λ$ and $ω_e \cos Λ$ are constants since the vehicle is substantially stationary on the earth's surface and therefore these signals can be computed mathematically and produced by conventional potentiometers.

The above description is of a preferred embodiment of the invention, and many modifications may be made thereto without departing from the spirit and scope of the invention, which is defined in the appended claims.

What is claimed is:

1. A gyrocompassing system comprising means defining an inertial reference including three mutually perpendicular axes defined as the heading axis, the cross heading axis and the Z axis, said Z axis adapted to be aligned with vertical, first inertial means to inertially produce a signal representing acceleration along said cross heading axis, second inertial means to inertially produce a signal representing acceleration along said heading axis, resolver means responsive to the output signals of said first and second inertial means and to an applied signal representing an angle to produce an output signal proportional to the output signal of said first inertial means times the sine of the angle represented by said applied signal minus the output signal of said second inertial means times the cosine of the angle represented by said applied signal, means responsive to the output signal of said resolver means to change the angle represented by said applied signal until the output signal of said resolving means becomes zero, and means responsive to the output signal of said first inertial means and said signal representing an angle to cause said inertial reference to precess about said heading axis at a rate proportional to the output signal of said first inertial means minus a constant times the cosine of said angle, and means responsive to the output signal of said second inertial means and said signal representing an angle to cause said inertial reference to precess about said cross heading axis at a rate proportional to the output signal of said second inertial means plus a constant times the sine of said angle.

2. A gyrocompassing system comprising a resolver means having first, second and third inputs to produce an output signal proportional to the signal applied to said first input times the sine of the angle represented by the signal applied to said third input minus the output signal applied to said second input times the cosine of the angle represented by the signal applied to said third input, means defining an inertial reference including three mutually perpendicular axes defined as the heading axis, the cross heading axis and the Z axis, said Z axis adapted to be aligned with vertical, first inertial means to apply a first signal representing acceleration along said cross heading axis to said first input of said resolver means, second inertial means to apply a second signal representing acceleration along said heading axis to said second input of said resolver means, angular rate means to produce an output signal representing the rate said heading and cross heading axes turn about said Z axis, adding means responsive to the output signals of said angular rate means and said resolver means to produce an output signal representing the sum of the output signal of said angular rate means and the output signal of said resolver means, integrating means to integrate the output signal of said adding means to produce a signal representing an angle and apply the signal to the third input of said resolving means, means responsive to the output signal of said first inertial means and the output signal of said integrating means to cause said inertial reference to precess about said heading axis at a rate proportional to the output signal of said first inertial means minus a constant times the cosine of the angle represented by the output signal of said integrating means, and means responsive to the output signal of said second inertial means and the output signal of said integrating means to cause said inertial reference to precess about said cross heading axis at a rate proportional to the output signal of said second inertial means plus a constant times the sine of the angle represented by the output signal of said integrating means.

3. A gyrocompassing system comprising resolver means having first and second inputs and an input shaft to produce an output signal proportional to the signal applied to said first input times the sine of the angular position of said input shaft minus the signal applied to said second input times the cosine of the angular position of said input shaft, means defining an inertial reference including three mutually perpendicular axes defined as the heading axis, the cross heading axis and the Z axis, said Z axis adapted to be aligned with vertical, first inertial means to apply a signal representing acceleration along said cross heading axis to the first input of said resolver means, second inertial means to apply a signal representing acceleration along said heading axis to the second input of said resolver means, angular rate means to produce an output signal representing the rate at which said heading and cross heading axes are turning about said Z axis, adding means responsive to the output signals of said angular rate means and said resolver means to produce an output signal representing the sum of the output signals of said angular rate means and said resolver means, means responsive to the output signal of said adding means to rotate the input shaft of said resolving means, means responsive to the output signal of said first inertial means and the angular position of the input shaft of said resolving means to cause said inertial reference to precess about said heading axis at a rate proportional to the output signal of said first inertial means minus a constant times the cosine of the angular position of the input shaft of said resolving means, and means responsive to the output signal of said second inertial means and the angular position of the input shaft of said resolving means to cause said inertial reference to precess about said cross heading axis at a rate proportional to the output signal of said second inertial means plus a constant times the sine of the angular position of the input shaft of said resolving means.

4. A gyrocompassing system comprising, means defining an inertial reference including three mutually perpendicular axes defined as the heading axis, the cross heading axis and the Z axis, said Z axis adapted to be aligned with vertical, first inertial means to inertially produce a first signal representing acceleration along said heading axis, second inertial means to inertially produce a second signal representing acceleration along said heading axis, resolver means having an input shaft and responsive to said first and second signals to produce an output signal proportional to said first signal times the sine of the angle represented by the angular position of said input shaft minus said second signal times the cosine of the angle represented by the angular position of said input shaft, means responsive to the output signal of said resolver means to rotate the input shaft of said resolver means until said output signal of said resolver means becomes zero, means responsive to the output signal of said first inertial means and the angular position of the input shaft of said resolver means to cause said inertial reference to precess about said heading axis at a rate proportional to the output signal of said first inertial means minus a constant times the cosine of the angular position of the input shaft of said resolver means, and means responsive to the output signal of said second inertial means and the angular position of the input shaft of said resolver means to cause said inertial reference to precess about said cross heading axis at a rate proportional to the output signal of said second inertial means plus a constant times the sine of the angular position of the input shaft of said resolver means.

5. A gyrocompassing system comprising a cluster having defined therein three mutually perpendicular axes defined as the heading axis, the cross heading axis and the Z axis, said Z axis adapted to be aligned with vertical, a first accelerometer mounted on said cluster to produce an output signal representing the acceleration of said cluster along said cross heading axis, a second accelerometer mounted on said cluster to produce an output signal representing the acceleration of said cluster along said heading axis, first amplifying means to amplify the output signal of said first accelerometer, second amplifying means to amplify the output signal of said second accelerometer, gyro means on said cluster to define an inertial reference, means responsive to said inertial reference to maintain said cluster unpivoted about said heading and cross heading axes with respect to said inertial reference, integrating means to integrate an applied input signal and produce an output signal representing an angle, resolver means responsive to the output signals of said first and second amplifying means and said integrating means to produce an output signal proportional to the output signal of said first amplifying means times the sine of the angle represented by the output signal of said integrating means minus the output signal of said second amplifying means times the cosine of the angle represented by the output signal of said integrating means, angular rate means mounted on said cluster to produce an output signal representing the rate at which said cluster rotates about said Z axis, adding means responsive to the output signals of said angular rate means and said resolver means to apply a signal representing the sum of the output signals of said angular rate means and said resolver means to said integrating means, means responsive to the output signal of said first amplifying means and to the output signal of said integrating means to cause said inertial reference defined by said gyro means to precess about said heading axis at a rate proportional to the output signal of said first amplifying means minus a constant times the cosine of the angle represented by the output signal of said integrating means, and means responsive to the output signal of said second amplifying means and the output signal of said integrating means to cause said inertial reference defined by said gyro means to precess about said cross heading axis at a rate proportional to the output signal of said second amplifying means plus a constant times the sine of the angle represented by the output signal of said integrating means.

6. A gyrocompassing system comprising a cluster having defined therein three mutually perpendicular axes defined as a heading axis, a cross heading axis, and a Z axis, said Z axis adapted to be aligned with vertical, a first accelerometer mounted on said cluster to produce an output signal representing the acceleration of said cluster along said cross heading axis, a second accelerometer mounted on said cluster to produce an output signal representing the acceleration of said cluster along said heading axis, first amplifying means to amplify the output signal of said first accelerometer, second amplifying means to amplify the output signal of said second accelerometer, gyro means on said cluster to define an inertial reference, means responsive to said inertial reference to maintain said cluster unpivoted about said heading and cross heading axes with respect to said inertial reference, integrating means to position an output shaft at an angle representing the integral of an applied input signal, resolver means having an input shaft driven by the output shaft of said integrating means and responsive to the output signals of said first and second amplifying means to produce an output signal proportional to the output signal of said first amplifying means times the sine of the angle represented by the angular position of said input shaft minus the output signal of said second amplifying means times the cosine of the angle represented by the angular position of said input shaft, means to apply the output signal of said resolver means to said integrating means, means responsive to the output signal of said first amplifying means and to the output signal of said integrating means to cause said inertial reference defined by said gyro means to precess about said heading axis at a rate proportional to the output signal of said first amplifying means minus a constant times the cosine of the angle represented by the output signal of said integrating means, and means responsive to the output signal of said second amplifying means and the output signal of said integrating means to cause said inertial reference defined by said gyro means to precess about said cross heading axis at a rate proportional to the output signal of said second amplifying means plus a constant times the sine of the angle represented by the output signal of said integrating means.

References Cited by the Examiner
FOREIGN PATENTS
153,497  10/1953  Australia.

MALCOLM A. MORRISON, *Primary Examiner.*

K. DOBYNS, *Assistant Examiner.*